US010282373B2

(12) United States Patent
Tadlock et al.

(10) Patent No.: US 10,282,373 B2
(45) Date of Patent: May 7, 2019

(54) SUBJECT-BASED VITALITY

(75) Inventors: Michael Tadlock, Belmont, CA (US); Tom Quiggle, San Carlos, CA (US)

(73) Assignee: EXCALIBUR IP, LLC, New York, NY (US)

( * ) Notice: Subject to any disclaimer, the term of this patent is extended or adjusted under 35 U.S.C. 154(b) by 130 days.

(21) Appl. No.: 12/426,133

(22) Filed: Apr. 17, 2009

(65) Prior Publication Data
US 2010/0268728 A1 Oct. 21, 2010

(51) Int. Cl.
| | |
|---|---|
| G06F 16/48 | (2019.01) |
| G06F 16/58 | (2019.01) |
| G06F 16/68 | (2019.01) |
| G06F 16/78 | (2019.01) |
| G06F 16/435 | (2019.01) |

(52) U.S. Cl.
CPC ............ *G06F 16/437* (2019.01); *G06F 16/48* (2019.01); *G06F 16/58* (2019.01); *G06F 16/68* (2019.01); *G06F 16/78* (2019.01)

(58) Field of Classification Search
CPC ..... G06F 12/12–12/128; G06F 16/24–16/248; G06F 16/40–16/787
USPC ................... 707/771, 768; 715/795
See application file for complete search history.

(56) References Cited

U.S. PATENT DOCUMENTS

| | | | | |
|---|---|---|---|---|
| 5,918,249 | A * | 6/1999 | Cox et al. ........................ | 711/203 |
| 7,860,895 | B1 * | 12/2010 | Scofield et al. ............... | 707/802 |
| 2007/0022003 | A1 * | 1/2007 | Chao et al. .................... | 705/14 |
| 2007/0110107 | A1 * | 5/2007 | Tighe ..................... | H04L 25/14 |
| | | | | 370/503 |
| 2007/0271270 | A1 * | 11/2007 | Dubinko et al. ................. | 707/7 |
| 2008/0151315 | A1 * | 6/2008 | Flake et al. .................... | 358/401 |
| 2008/0162275 | A1 * | 7/2008 | Logan et al. ................... | 705/12 |

(Continued)

FOREIGN PATENT DOCUMENTS

| | | |
|---|---|---|
| JP | 2007-122513 | 5/2007 |
| KR | 10-2003-0070480 A | 8/2003 |

(Continued)

OTHER PUBLICATIONS

IEEE, "The Authoritative Dictionary of IEEE Standards Terms", IEEE, Feb. 27, 2007, Seventh Edition, pp. 545-546.*

(Continued)

*Primary Examiner* — Chameli Das
*Assistant Examiner* — Joanne G Macasiano
(74) *Attorney, Agent, or Firm* — James J. DeCarlo; Greenberg Traurig, LLP

(57) ABSTRACT

Embodiments are directed towards managing pushed vitality updates of recent user-generated content (UGC). A vitality service is arranged to receive pushed vitality updates that each include a resource identifier and at least one other type of vitality information referring to recent UGC on a network device. The vitality service is configured to manage the pushed vitality updates according to recency and to receive query requests for vitality information. In response to a query request, the vitality service searches for vitality updates and provides to another network device recent vitality information based on the query request. The recent vitality information includes at least one or more resource identifiers and one or more other types of vitality information so that the other network device can access the full UGC for display.

20 Claims, 6 Drawing Sheets

(56) References Cited

U.S. PATENT DOCUMENTS

| | | | |
|---|---|---|---|
| 2008/0195664 A1* | 8/2008 | Maharajh et al. | 707/104.1 |
| 2008/0228733 A1* | 9/2008 | Davis et al. | 707/3 |
| 2009/0089352 A1 | 4/2009 | Davis et al. | |
| 2009/0094279 A1* | 4/2009 | Carmeli et al. | 707/104.1 |

FOREIGN PATENT DOCUMENTS

| | | |
|---|---|---|
| KR | 10-2005-0091998 A | 9/2005 |
| KR | 10-2007-0107589 A | 11/2007 |

OTHER PUBLICATIONS

Jensen, Christian S., Carmen Ruiz Vicente, and Rico Wind. "User-generated content: The case for mobile services." Computer 41.12 (Year: 2008).*

Gaonkar, Shravan, et al. "Micro-blog: sharing and querying content through mobile phones and social participation." Proceedings of the 6th international conference on Mobile systems, applications, and services. ACM. (Year: 2008).*

\* cited by examiner

SUBJECT-BASED VITALITY

TECHNICAL FIELD

The present invention relates generally to managing data at a network device and, more particularly, but not exclusively to providing summaries of recently generated user content and activity to another network device.

BACKGROUND

The amount of content readily available to a user over a network, such as the Internet, has increased almost exponentially over the past several decades. Moreover, there is little indication that this rate of increase in available content will not continue in the foreseeable future. Providers of such content include blogs, news sources, sports sources, weather sources, libraries, friends, universities, businesses, and the like. Much of this content is provided in the form of user-generated content and activity. For example, user-generated content can include photos that a user uploads to a photo sharing service for sharing with friends or family. User activity can include joining an online group, creating online relationships, or winning a fantasy sports league.

In some cases, web services that maintain databases of user-generated content and activity allow these databases to be searched, such as by a web crawler or other Internet search utility. Typically, however, user-generated content and activity is created at a rate that greatly outpaces the frequency at which a database can be searched. Consequently, search utilities can often return results that are quickly outdated due to new user-generated content and activity being added to a database. In addition, many types of user-generated content and activity are not readily accessible via conventional web-searching techniques. For example, user-generated content can exist in the form of a user's status, such as a user's mood, location, on-line availability, or avatar configuration. User-generated content such as this changes almost regularly, and it is readily searchable. Thus, locating many types of user-generated content remains a challenge. Therefore, it is with respect to these considerations and others, that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
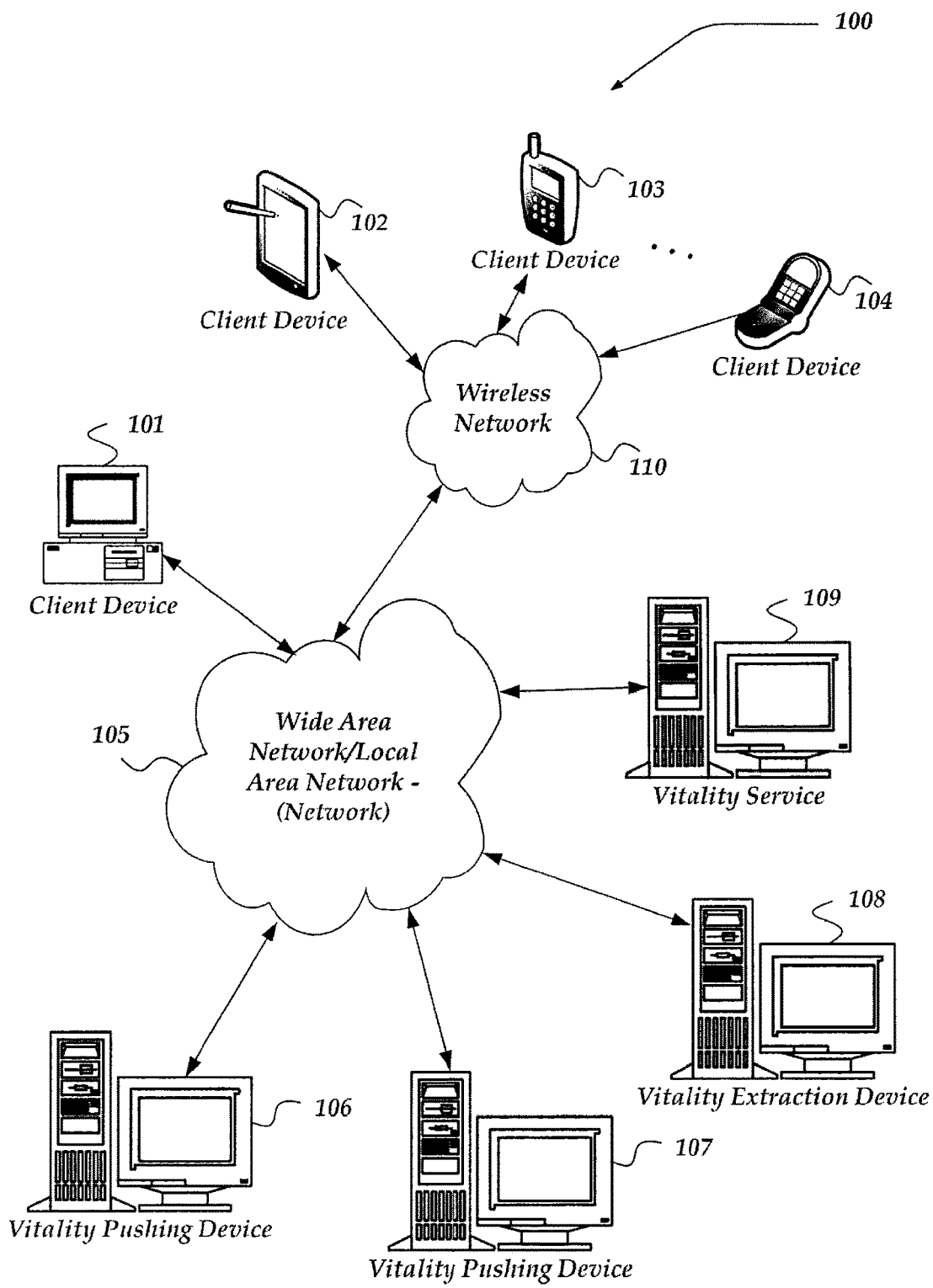
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "user-generated content" or UGC as used herein refers to user-provided data and/or data pertaining to user activity. UGC can include, for example, ratings, reviews, tags, comments, message board entries, blog entries, photo files, music files, music playlists, shopping lists, and so on. UGC can also include data related to a user's activity, such as a user's online status, a user's mood, a user's participation in a game ladder or fantasy sports league, a song that a user is currently listening to, and so on. Additionally, UGC can include various combinations of these types of data, such as a combination of user provided data and data relating to a user's activity. For example, UGC can include a user's notes regarding several sportspersons in a fantasy sports league and that same UGC can also include which of the sportspersons that user has currently enlisted. In general, UGC is affiliated with an individual. Thus, for example, UGC does not include information generated by an on-line merchant representing a company, an advertiser providing an advertisement service, or a journalist representing a news service. By contrast, UGC does include, for example, a blogger's blog entry, a movie-goer's review of a film, and/or a shopper's grocery list and/or similar content generated by a user. Further, UGC is not so limited to these examples, and other information can be described as content that is generated by a user.

As used herein, the term "vitality update" refers to a collection of metadata that refers to UGC residing at a network device and which is transmitted from the network device to another network device. As used herein, the term "vitality information" refers to a portion of metadata and/or a type of metadata that is provided within a vitality update. For example, a time stamp can be one type of vitality information and a keyword can be another type of vitality information.

A vitality update as employed herein does not include the entirety of the UGC itself. One embodiment of a vitality update and the vitality information contained therein is described in more detail below in conjunction with FIG. 3. Briefly, however, in one embodiment, a vitality update includes the following types of vitality information: a resource identifier (e.g., a URL, network address, or other link) that provides a path back to the entirety of the corresponding UGC, an identifier unique to the author of the UGC, an identifier that specifies the source of the UGC (e.g., Yahoo!'s Flickr service or Twitter), an identifier unique to the source of the UGC that can be used to disambiguate distinct UGC elements from the same user and source, an identifier describing the type of the UGC (e.g., a blog post vs. a photo upload) and a content summary of the UGC. A content summary, for example, can include a brief summary of UGC (e.g., a thumbnail of a photo file, a sample of an audio file, a summary of a blog post, or the like). In one embodiment, vitality information can be created automatically prior to pushing the vitality update. In another embodiment, a user of client device can determine or specify the metadata for the vitality information or a portion of the vitality information. Vitality information can also include information for indexing and/or sorting the vitality update, such as one or more keywords or tags. In another embodiment, such keywords or tags are separate vitality information that may or may not be included with a vitality update.

A vitality update as employed herein is typically created in response to a user uploading, creating, or otherwise initiating the production of UGC at a network device. As will be discussed in more detail below, a vitality update is not, for example, content that is simply posted at a website. Rather, a vitality update is data that is intended to be pushed between one or more network devices. Thus, a vitality update typically may not be located by conventional web searching techniques, such as by a web-crawler or other search utility. In contrast to conventional systems that index content based on relationship between the author and the viewer (e.g., via social networking website newsfeed), embodiments of vitality updates provide for indexing and delivering of content based, for example, on subject or location. Further, the type of content to which a vitality update refers is often not searchable by conventional techniques. A user's configuration of a fantasy sport team, for example, is one type of content that is not accessible by conventional searching techniques but is accessible through a vitality update. Typically, metadata about a user's configuration of a sports team is not content that is accessible to a search engine. A vitality update can capture the user's configuration in vitality information so that it may be obtained by other users, and in particular by other users who would otherwise be unable to locate and/or access that content but may nevertheless seek to view it. For example, such users may not be affiliated with a fantasy sports league but are interested in gauging public opinion of a sportsperson by evaluating how that sportsperson is being implemented in fantasy sports.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing pushed vitality updates of recent UGC. In one embodiment, a vitality service is arranged to receive pushed vitality updates that each include a resource identifier and at least one other type of vitality information referring to recent UGC on a network device. The vitality service is configured to manage the pushed vitality updates according to recency and to receive query requests for vitality information. In response to a query request, the vitality service searches for vitality updates and provides to another network device recent vitality information based on the query request. The resultant vitality information includes at least one or more resource identifiers and one or more other types of vitality information so that the other network device can access the full UGC for display.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-104, vitality pushing devices 106-107, vitality extraction device 108, and vitality service 109.

Client devices 101-104 may include virtually any device for transmitting UGC to and/or receiving UGC from another network device and/or initiating the creation of UGC at another network device, including, without limit, vitality pushing devices 106-107, vitality extraction device 108, and/or other client devices.

Client devices 102-104 may include virtually any mobile computing device capable of receiving and sending UGC over a network, such as wireless network 110, or the like. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send UGC through webpages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive UGC from and/or provide UGC to another computing device, including, without limit, vitality pushing devices 106-107, vitality extraction device 108, and/or another network device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device. Such user account, for example, may be configured to enable the user to receive emails, send/receive IM messages, SMS messages, access selected webpages, download scripts, applications, or a variety of other content, or perform a variety of other actions over a network. However, managing of messages or otherwise accessing and/or downloading content, may also be performed without logging into the user account.

Thus, a user of client devices 101-104 may employ any of a variety of client applications to create, upload, and/or initiate the creation of UGC at a remote network device. Client devices 101-104 may also employ one or more client applications to retrieve UGC from a remote network device, including vitality pushing devices 106-107, vitality extraction device 108, and/or other network devices.

Wireless network 110 is configured to couple client devices 102-104 to network 105. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 105 is configured to couple computing devices to each other, including, client device 101, vitality pushing devices 106-107, vitality extraction device 108, vitality service 109, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Vitality pushing devices 106-107 can include virtually any computing device that is configured and arranged to receive, provide, and/or assist in providing any of a variety of UGC over a network. As such, vitality pushing devices 106-107 may operate as a website for providing and/or accessing UGC including, but not limited to blog information, educational information, music/video information, social networking content and/or services, messaging, or any of a variety of other content. Vitality pushing devices 106-107, however, are not limited to web servers, and may also operate a messaging server, a File Transfer Protocol (FTP) server, a database server, or the like. Additionally, vitality pushing devices 106-107 can be configured to perform different operations. Thus, for example, vitality pushing device 106 may be configured as a website server for multimedia content and vitality pushing device 107 may be configured as a database server for a variety of content, Vitality pushing devices 106-107 are generally configured to receive UGC from any one of client devices 101-104. Vitality pushing devices 106-107 are configured to extract and/or create vitality information from UGC and provide that information as a vitality update. In general, vitality pushing devices 106-107 do not receive requests for vitality updates nor are vitality pushing device 106-107 searched by vitality service 109. Rather, vitality pushing devices 106-107 push vitality updates to vitality service 109 in response to new UGC being created. In addition, vitality updates may be pushed for any of a variety reasons. In one embodiment, vitality pushing devices 106-107 automatically push vitality updates in response to the creation of UGC. In another embodiment, vitality pushing device 106-107 push vitality updates that contain a certain type of content. Further, vitality pushing devices 106-107 can also be configured so that vitality updates are sent when a client device provides an authorization to do so. In one embodiment, vitality pushing devices 106-107 may have an associated set of user-selectable permissions for selecting whether a vitality update is to be sent when UGC is created. For example, a user of one of client devices 101-104 may employ a set of permissions to prevent personal information from being pushed as a vitality update.

Embodiments of vitality pushing devices 106-107 can push vitality updates in any of variety of ways. In one embodiment, a vitality update can be a file that is transmitted within a message. In another embodiment, a vitality update can be incorporated into a message sent between one of vitality pushing devices 106-107 and vitality service 109. In one embodiment, vitality pushing devices 106-107 do not store a vitality update but purge the vitality update after it has been pushed. For example, vitality pushing devices 106-107 may purge a vitality update from a temporary memory or cache when vitality service 109 confirms receipt of a vitality update.

Vitality service 109 includes one or more computing devices that are configured to receive and store pushed vitality updates. In general, such computing devices can employ a data store for storing pushed vitality updates. Embodiments of data store can be located, for example, at an individual computing device or aggregated across several computing devices and/or located at another computing device.

Vitality service 109 is configured to manage vitality updates that are pushed to vitality service 109. In particular, vitality service 109 is configured to manage pushed vitality updates based on their recency. In one embodiment, vitality service 109 is configured to purge vitality updates from vitality service 109 when new, or more recent vitality updates are pushed to vitality service 109. For example, vitality service 109 can purge a vitality update based on timestamp information associated with the vitality update. In another embodiment, vitality service 109 is configured to sort vitality updates based on recency, such as by sorting vitality updates according to corresponding time stamp information.

Vitality service 109 is also configured to receive query requests from vitality extraction device 108. A query request can include, for example, at least one search criterion based on a particular subject matter for searching vitality service 109.

Vitality service 109 is further configured to provide search results in response to the query request. The search results include resulting vitality information associated with one or more vitality updates identified by the search. The resulting vitality information, in one embodiment, includes, at least, the associated content summaries, author identifier and resource identifiers of the identified vitality updates. In particular, the resource identifier of the resulting vitality information can be provided so that UGC can be displayed at another network device, such as at the vitality extraction device 108 itself and/or at any one of client devices 101-104.

Vitality extraction device 108 includes virtually any computing device that is configured to extraction vitality updates from vitality service 109. Vitality extraction device 108 may provide some of the same functionality as vitality pushing devices 106-107 but is also configured to retrieve UGC by first pulling vitality updates and/or vitality information from vitality service 109. For example, vitality extraction device 108 may operate as a website, a messaging server, a File Transfer Protocol (FTP) server, a database server, or the like that queries vitality service 109. In one embodiment, vitality extraction device 108 may employ vitality service 109 to retrieve UGC at vitality pushing devices 106-107.

Devices that may operate as vitality pushing devices 106-107, vitality extraction device, 108, and/or vitality service 109 include, but are not limited to personal computers, desktop computers, multiprocessor systems, microprocessor-based or programmable consumer electronics, network PCs, servers, network appliances, and the like.

Although vitality service 109 is illustrated as a distinct network device, the invention is not so limited. For example, a plurality of network devices may be configured to perform the operational aspects of vitality service 109. For example, vitality updates may be stored within one or more network devices, while analysis, management, and/or searching for one or more vitality updates may be performed within one or more other network devices. However, other combinations are also possible. In one embodiment, for example, vitality service 109 is a three tier system that includes forward-facing web services machines that respond to requests for vitality updates, a set of back-end data store machines that store the aggregated vitality updates, and one or more sets of machines providing index services into the data store. Thus, the invention is not to be construed as being narrowed by the arrangement illustrated in FIG. 1, and others are also within the scope of the invention.

Illustrative Network Device

Figure 2:
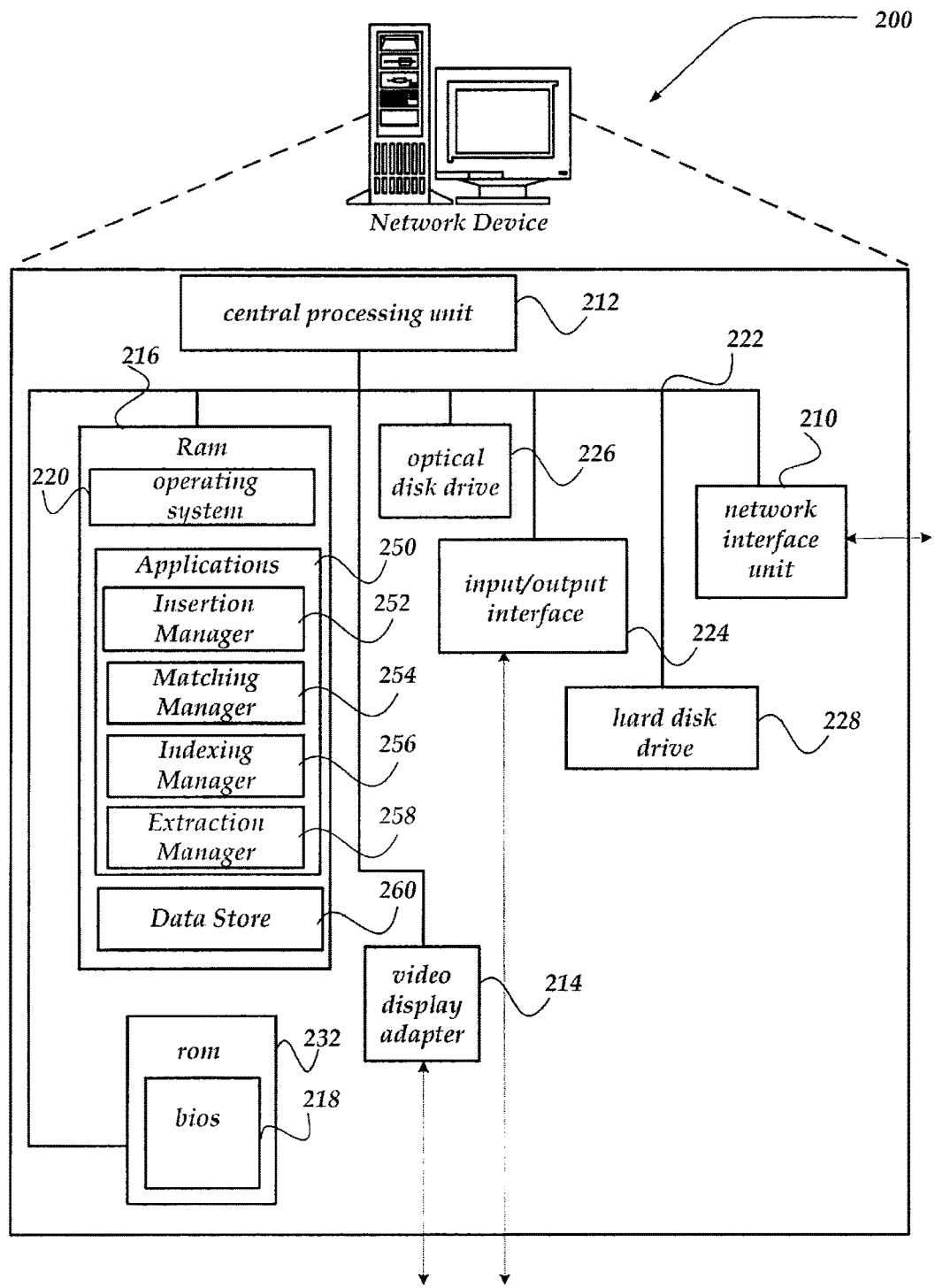
FIG. 2 shows one embodiment of a network device that may be included in a system implementing the invention.

FIG. 2 shows one embodiment of a network device, according to one embodiment of the invention. Network device 200 may include many more components than those shown. The components shown, however, are sufficient to disclose an illustrative embodiment for practicing the invention. In one embodiment, network device 200 may represent vitality service 109 of FIG. 1. In another embodiment, network device 200 may represent a portion of vitality service 109, such as one or more forward-facing web services machines, back-end data store machines, or machines providing index services.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, and removable storage device 226 that may represent a tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. And, input/output interface 224. As illustrated in FIG. 2, network device 200 also can communicate with the Internet, or some other communications network, via network interface unit 210, which is constructed for use with various communication protocols including the TCP/IP protocol, Wi-Fi, Zigbee, WCDMA, HSDPA, Bluetooth, WEDGE, EDGE, UMTS, or the like. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Applications 250 include insertion manager 252, matching manager 254, indexing manager 256, and extraction manager 258. One or more of applications 250 can also be referred to individually or collectively as a vitality manager.

Insertion manager 252 is configured and arranged for receiving pushed vitality updates and to determine whether pushed vitality updates should be stored. Insertion manager 252 may also employ various types of criteria for validating a vitality update. For example, insertion manager 252 can be configured to allow or reject a vitality update based on a user, a network device, and/or a network service associated with the vitality update.

Insertion manager 252 can also be configured to purge vitality updates from a data store based on their recency. In one embodiment, insertion manager 252 is configured to replace existing vitality updates with new vitality updates as the new vitality updates are pushed to network device 200. In one embodiment, when a vitality update is pushed to network device 200, insertion manager 252 is configured to first determine what the vitality information of the vitality update is related to and then to purge the oldest vitality update related to that vitality information. In one embodiment, insertion manager 252 may identify the recency or age of a vitality update based on the time/date at which the vitality update's corresponding UGC is first generated. In another embodiment, insertion manager 252 may identify recency based on the time/date at which a vitality update is pushed to network device 200 and/or received by network device 200.

In one embodiment, insertion manager 252 can be configured to replace an existing vitality update based at least in part on other vitality information contained in the existing vitality update, such as author or creator, title, and/or UGC type. In another embodiment, vitality updates can be replaced independent of certain types of vitality information. For example, insertion manager 252 may replace a vitality update independent of the UGC type to which the vitality update refers. Thus, in such an example insertion manager 252 can replace a vitality update referring to a photo file with a vitality update referring to a blog entry.

Insertion manager 252 can be further configured to perform other actions. In one embodiment, vitality manager 252 confirms whether a vitality update has been received at network device 200. For example, insertion manager 252 can transmit a confirmation message to the network device that pushes the vitality update such that the network device can remove the vitality update from memory. In other embodiments, insertion manager 252 can create and add time stamp information to a vitality update, and/or associate a geographic location with a vitality update. For example, insertion manager 252 can be configured to extract keywords from a blog summary or determine a geographic location from an IP address and/or other information.

Matching manager 254 is configured and arranged to determined whether vitality updates match pre-determined criteria. Such pre-determined criteria can be defined by an administrator of network device 200. For example, another network device or service may employ matching manager 254 to detect when vitality updates of interest are pushed to network device 200. In one embodiment, matching manager 254 can also be configured to push vitality updates of interest or vitality information of interest to other network devices. For example, a third party network device can employ matching manager 254 to monitor for vitality updates of interest and to push vitality updates of interest to the third party network device.

Indexing manager 256 is configured and arranged to index vitality updates, when vitality updates are pushed to vitality service 109. In one embodiment, indexing manager 256 is configured to index vitality updates based on their geographic location. For example, indexing manager 256 can index vitality updates corresponding to photo uploads based on geolocation tags within the uploaded photo information. In one embodiment, indexing manager 256 indexes vitality updates based on vitality information. Further, embodiments of indexing manager 256 can also be configured to index vitality updates according to multiple indexes, such as one index referring to content summary and another referring to keywords and/or tags.

Extraction manager 258 is configured and arranged to receive query requests for vitality information. When extraction manager 258 receives a query request, extraction manager 258 identifies a search criterion based on parameters provided with the query request and searches a data store for vitality updates based on that search criterion. In one embodiment, extraction manager 258 employs indexing manager 256 to retrieve vitality updates according to one or more indexes corresponding to the search criterion expressed in the query. For example, extraction manager 258 can utilize an index managed by index manager 256 to select vitality updates from the data store according to content summaries and/or other vitality information associated with the vitality updates, such as geographic location, title, UGC type, and so on. In one embodiment, extraction manager 258 may employ more than one search criterion according to a particular subject matter of the query request. For example, extraction manager 258 can search a data store for content summaries of thumbnails pertaining to a particular subject and separately search for content summaries of blog summaries pertaining to that same subject. Additional query parameters may specify criterion used by extraction manager 258 to sort the vitality updates retrieved from the data store. For example, extraction manager 258 could sort the vitality updates first by author then, for multiple results from the same author, reverse chronologically by publication date.

Extraction manager 258 is also configured to provide the results of a search to a network device. In one embodiment, extraction manager 258 provides search results that include one or more vitality updates in their entirety. In another embodiment, extraction manager 258 provides a limited amount of vitality information, for example a content summary and resource identifier rather than the entirety of the vitality information available in a vitality update.

The mass memory also includes data store 260. In one embodiment, data store 260 is located exclusively at network device 200. In another embodiment, data store 260 is a portion of a data store that is aggregated across several network devices.

Data store 260 is configured such that insertion manager 252, indexing manager 256, and extraction manager 258 can read, write, and/or manipulate the data contained in data store 260. Data store 260 can also be configured to interface with matching manager 254.

Data store 260 may include virtually any mechanism usable for storing vitality updates and vitality information, including but not limited to a file, a folder, a document, or an application, such as a database, spreadsheet, or the like. Data store 260 is configured to store individual vitality updates in a variety of formats, including, for example, a text file, an HTML document, an executable application, and so on, or as text or code within a file, spreadsheet, or the like.

Figure 3:
FIG. 3 shows one embodiment of a table illustrating a vitality update and vitality information relating to the vitality update.

FIG. 3 shows one embodiment of a table that represents a vitality update that may be stored by a data store, such as data store 260. Table 300 in FIG. 3 may include many more or less types of vitality information than those shown. The types of vitality information shown, however, are sufficient to disclose an illustrative embodiment for practicing the invention. The vitality information of table 300 includes Content summary, Resource Identifier, Publication Date, Source ID, Title, UGC Type, Author/Creator ID, Keyword(s), Tags, Location(s), Where On Earth ID (WOEID), Source Unique Identifier (SUID), Thumbnail URL, Adult, Blocked for Country List, Last Updated Time, and INTL. The list of attributes in a vitality update is extensible and may be extended by the provider to include additional metadata about the UGC that triggered the vitality update. This additional, descriptive, metadata can allow vitality service search systems to return the event to relevant queries.

Content summary can include a brief summary of UGC residing at a network device. In one embodiment content summary is searchable. The content summary can include, for example, text, code, and/or other information related to UGC residing at a remote network device. In one embodiment, the network device that pushes content summary automatically determines the information to be included in content summary. For example, the network device may include an application that analyzes UGC to determine content for content summary based on the frequency of repeated words or data in the UGC, the relevancy of certain portions of the UGC, the size of the UGC, and so on. In another embodiment, metadata contained in content summary is user-determined.

Resource identifier, in one embodiment, includes a valid Uniform Resource Locator (URL). However, the invention is not so limited, and in other embodiments a resource identifier can include a Uniform Resource Identifier (URI), an IP address, and/or another identifier referring to an address at which the UGC can be located. For example, a resource identifier can include a hypertext link that allows a user to be automatically routed to a network location of the UGC via a web browser.

Publication Date specifies the date and time at which a UGC element to which the vitality update refers was first published. Publication Date 306 is specified, for example, in RFC 3339 format.

Source ID is an identifier that refers to a service or other services that provide a vitality update. For example, Source ID can include an identifier that refers to an internal service such as Yahoo! Finance or an identifier that refers to an external service such as eBay or Twitter.

Author/Creator ID can include an identifier that specifies a user that created or initiated the UGC to which a vitality update refers. Author Creator ID can include, for example, a user name or user ID.

Title can specify a title or name of a vitality update or UGC to which the vitality update refers. The title or name can be the same title associated with the UGC, or can be a different title determined by a vitality pushing device or by a vitality service. In one embodiment, The title field may be constructed by a vitality system based on a template specific to the update's type. For example, a vitality update corresponding to a new connection between users A and B in a social network could be constructed from A and B's displayable nicknames and a localized string whose language is determined by the preference of the viewer. When the update is viewed by an English speaker the generated title would be "John Smith is connected Jane Doe." Whereas the same update viewed by a Spanish speaker would have a generated title of "John Smith es gama conectada de Jane Doe."

UGC Type can include an identifier that specifies a type of UGC to which a vitality update refers. For example, UGC Type can indicate that a vitality update refers to a music file, a photo file, an HTML document, a spreadsheet, and so on.

Keyword(s) and Tags are separate fields that can specify keywords and/or tags associated with UGC. In one embodiment, keywords and/or tags are provided in the vitality update before it is pushed to network device 200. In another embodiment, network device 200 is configured to provide Keywords/Tags by extracting information from the vitality update. For example, network device 200 can be configured to extract the information for Keyword(s)/Tags from a content summary.

Location(s) and WOEID can refer to geographic locations and/or geospatial indexes. Such locations and indexes can identify a street address, GPS coordinates, or even a latitude and a longitude provided by a GPS enabled camera.

SUID can include an identifier unique to the specific UGC element within a source.

Thumbnail URL can be a URL that refers to a network location containing a thumbnail or other type of image that can be associated with a vitality update. For example, a thumbnail URL can refer to the network location of a thumbnail image corresponding to UGC at the network device.

Adult and Blocked for Country List can identify vitality updates referring to access controlled vitality information. Adult can include an indicator that identifies whether a vitality refers to UGC that is to be accessible to someone who is 18 years or older. Blocked for Country List can specify certain countries to which a vitality update or UGC is not allowed or should not be provided.

Last Updated Time can refer to the most recent time at which UGC was updated.

INTL can indicate a terms of service agreement the author of UGC agreed to.

It will be understood that some of the items includes in table 300 may be omitted and that some of these items may or may not be required. Further, a vitality update may include other types of vitality information or various combinations of vitality information. In one embodiment, the type of vitality information associated with a vitality update may depend on UGC type. For example, a vitality update referring to a blog entry may have different types of vitality information than a vitality update referring to a playlist.

Generalized Operation

Figure 4A:
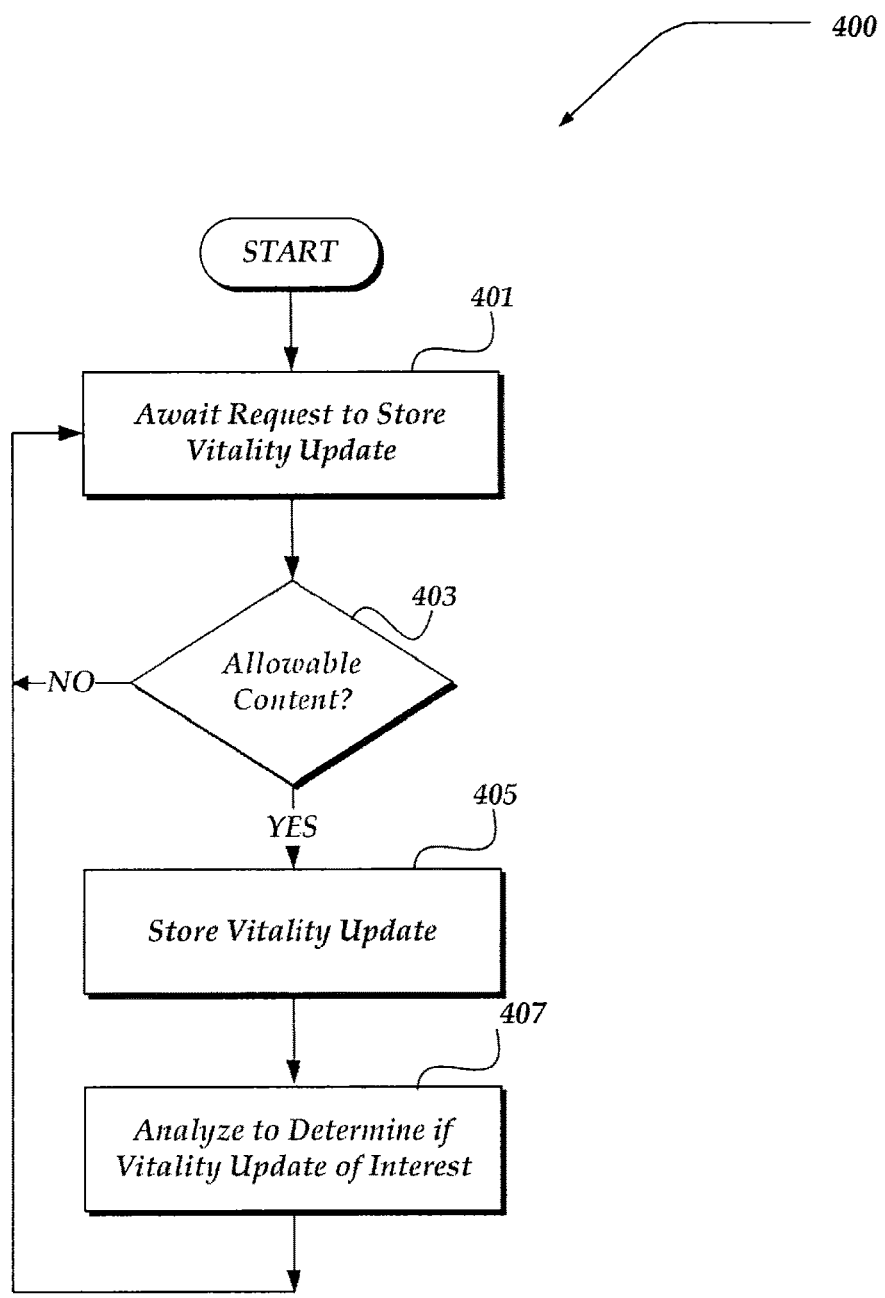
FIGS. 4A and 4B illustrate logical flow diagrams generally showing embodiments of processes for providing a vitality service.
Figure 4B:
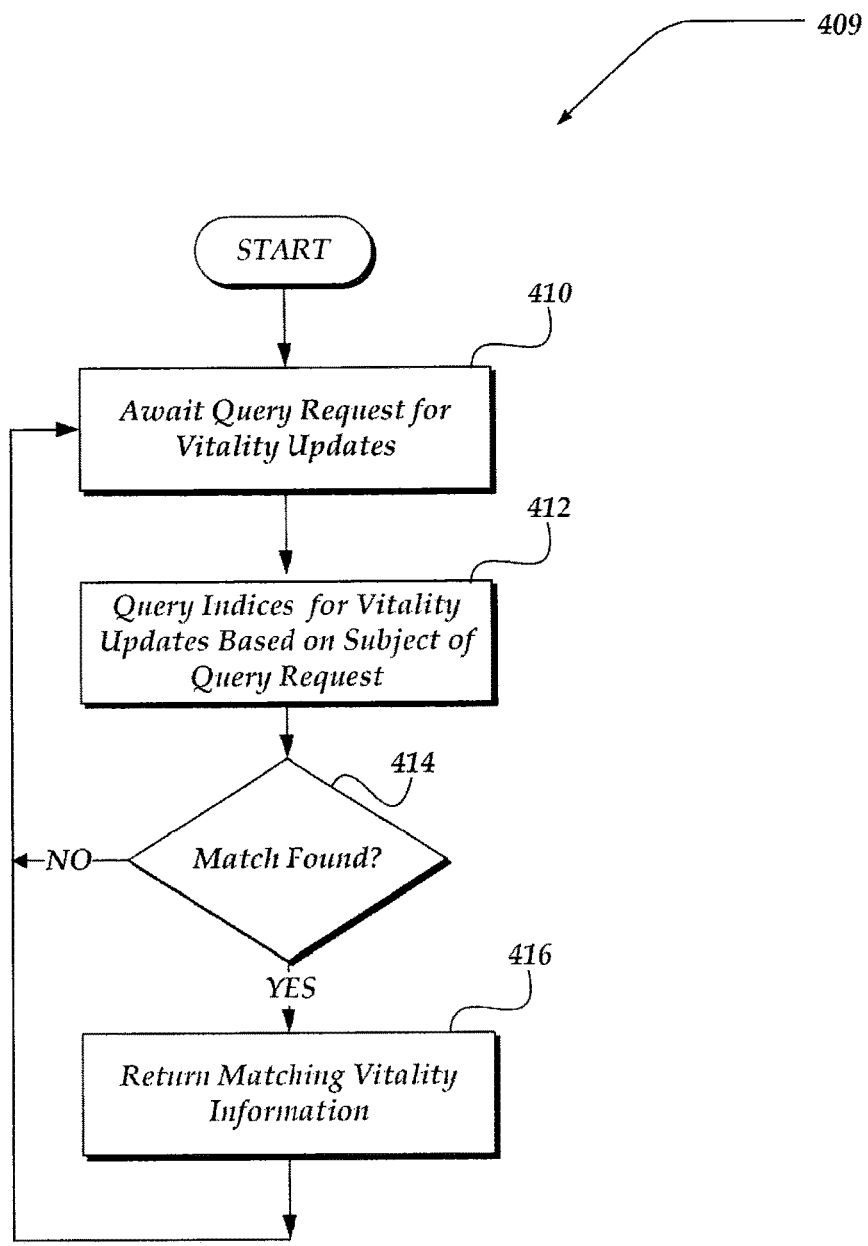

The operation of certain aspects of the invention will now be described with respect to FIGS. 4A and 4B. FIGS. 4A and 4B illustrate logical flow diagrams generally showing embodiments of a process for providing a vitality service. Process 400 of FIG. 4A and process 409 of FIG. 4B may be implemented within vitality service 109 of FIG. 1. However, the invention is not so limited, and at least a portion of processes 400 and 409 may be implemented within vitality pushing devices 106-107, vitality extraction device 108, and/or one or more client devices 101-104 of FIG. 1. In one embodiment, UGC associated with vitality updates and vitality information may be displayed at one or more client devices 101-104 of FIG. 1.

Process 400 of FIG. 4A begins, after a start block, at block 401, which awaits a request to store a pushed vitality update from a remote network device, such as one of vitality pushing devices 106-107 of FIG. 1. Processing may remain at decision block 401, for example, until an application interface command or other operation interrupts block 401. In such an event, processing may return to a calling process to perform other actions. If a request to store a pushed vitality update is received, however, processing flows to decision block 403 and the vitality service attempts to store the vitality update, including a resource identifier of the vitality update and at least one other type of vitality information corresponding to the vitality update.

At decision block 403, a pushed vitality update is analyzed to identify if the vitality update is to be stored. For example, the vitality update can be stored based on a user, a network device, and/or a network service associated with the vitality update. The vitality update is analyzed to determine if it meets the requirements for a well formed update. If required fields are missing or contain invalid values, the update is not stored and an error status returned to the caller. If the vitality is to be stored, however, processing flows to block 405 to store the vitality update. Otherwise, processing flows to decision block 401.

At block 405, the vitality update is stored. In one embodiment, the vitality update can replace a less recent vitality update having the same or a similar vitality information. In one embodiment, the vitality service is configured to store a predetermined number of vitality updates based on certain criteria. For example, the vitality service can be configured such that it maintains up to 100 of the most recent vitality updates having vitality information related to London. In another embodiment, the vitality service may maintain more or fewer vitality updates depending on content. For example, insertion manager 252 can be configured to maintain 1,000 vitality updates having vitality information related to England, 100 vitality updates having vitality information related to London, and 10 vitality updates having vitality information related to Piccadilly Circus. In other embodiments, a vitality service can store a predetermined number of vitality updates based on other criteria, such as according to a particular subject, an author or creator, and/or type of UGC.

While the vitality update is in the process of being stored at block 405, the vitality update may be modified to include additional or appended vitality information. In one embodiment, a time stamp may be added to the vitality update that corresponds to the time at which the vitality update was received by the vitality service. In another embodiment, the vitality service detects geo-coding data to associate a geographic location with the vitality update Processing continues next to block 407, where the vitality update is analyzed to determine whether it is a vitality update of interest. The vitality service may employ various matching criteria for determining vitality updates of interest. In one embodiment, the vitality service receives matching criteria from applications or 3rd party services that wish to detect for certain types of vitality updates. In one embodiment, a city, such as San Francisco, could host a community website that employs the vitality service to detect for vitality updates of interest. For example, the city of San Francisco could employ the service to detect vitality updates relating to recent photos of the city that have been uploaded by residents or tourists. Such photos could be automatically uploaded to the city's website when a user uploads a photo of, for example, the Golden Gate Bridge to a vitality pushing device. The vitality pushing device can in turn push the vitality update to the vitality service, while the vitality service pushes vitality information regarding the vitality update to the city's website. As will be discussed in more detail below, embodiments of processing carried out at block 407 can be employed for searching for vitality updates at block 412 of FIG. 4B.

Processing may then loop back to the block 401 to await an additional request to store a pushed vitality update.

Process 409 of FIG. 4B begins, after a start block, at block 410, which awaits a request to query pushed vitality events from a remote network device, such vitality extraction device 108 of FIG. 1. Processing may remain at decision block 410, for example, until an application interface command or other operation interrupts block 410. In such an event, processing may return to a calling process to perform other actions. If a request to query pushed vitality events is received, however, processing flows to decision block 412 and the vitality service attempts to search for vitality updates based, at least in part, on the query request.

As discussed above, a query request for vitality updates or associated vitality information can be based on a particular type of subject matter. The subject of a query request can pertain to requests regarding a person, a place, and/or an object of virtually any type of UGC, including a range spanning UGC that includes, for example, avatar updates, blog entries, user-reviews, uploaded playlists, a catalog of photographs, and so on.

At block 412, the vitality service searches for vitality updates matching the criteria of the query request received at block 410. In one embodiment, the subject of the query request includes one or more search criteria. For example, search criteria can include text or a combination of text and Boolean logic operations relating to a person, place, a thing, a type of data, and/or the like. During the search, vitality updates made be sorted and/or indexed in a variety of ways to search for vitality updates and to identify vitality updates and/or vitality information.

In another embodiment, such searching includes consulting indexes constructed by the process of block 407. In one embodiment, vitality updates are indexed independent of the author/creator associated with the vitality update. In one example, vitality updates associated with a social networking web site can be indexed independent of a user who actually provided UGC to the website. Typically, social networking websites allow access to UGC when a requesting user has a relationship association with a UGC provider. For example, a requesting user may be on a buddy list of the UGC provider. Embodiments of the vitality service, however, allow vitality updates to be indexed independent of relationship associations. Thus, vitality updates can be employed to retrieve UGC even if UGC providers and UGC receivers have no known association with one another.

Vitality updates can also be indexed based on their recency. Thus, vitality updates can be managed according to recency in one of at least two ways. In one way, vitality updates are managed by purging vitality updates from a data store based on their recency (i.e., when new vitality updates are pushed to the vitality service). In an additional or alternative way, vitality updates are managed by indexing based on recency. As discussed above, recency of a vitality update can be determined by time stamp information. Further, recency can be based on the time at which UGC was created or a time at which a vitality update was transmitted or received.

Processing continues next to decision block 414, where the vitality service determines whether the results of the search have identified any vitality updates. If no vitality updates are identified, corresponding status is returned to the caller and processing loops back to block 410 to await a new request; otherwise, processing continues to block 416. In one embodiment, the vitality service may provide an indication to a requesting device that the query request yielded no vitality updates and/or may prompt a requesting device to submit a query request with different search criteria.

If the results of the search identify one or more vitality updates, processing continues to block 416, where recent vitality information associated with the results of the search is provided in response to the query request. The recency of the search results may depend at least in part on the subject of the query request. For example, the subject of query request can range from frequently requested vitality information to more obscure vitality information. Thus, a query request pertaining to a popular subject, such as a celebrity personality, can result in recent vitality information that was all created in a short time frame, such as a minute, an hour, or a day. A query request pertaining to a less popular subject, such as 17th century baroque architecture, can result in vitality information that spans a time frame of days, months, or even years.

The recent vitality information of the resultant vitality updates includes, at least, one or more resource identifiers that refer to UGC residing at one or more network devices and at least one other type of vitality information corresponding to the UGC. In one embodiment, vitality information is displayed at a network device, and a user can select individual types of vitality information, including resource identifiers, to automatically bring up UGC for display at the network device. In one embodiment, simply the content summaries may be displayed to the user. In another embodiment, the resource identifiers are also displayed to the user. In addition, other embodiments may display other types of vitality information to a user so that a user can access UGC.

Processing may then loop back to block 410 to await an additional request to query pushed vitality events.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Use Case

Figure 5:
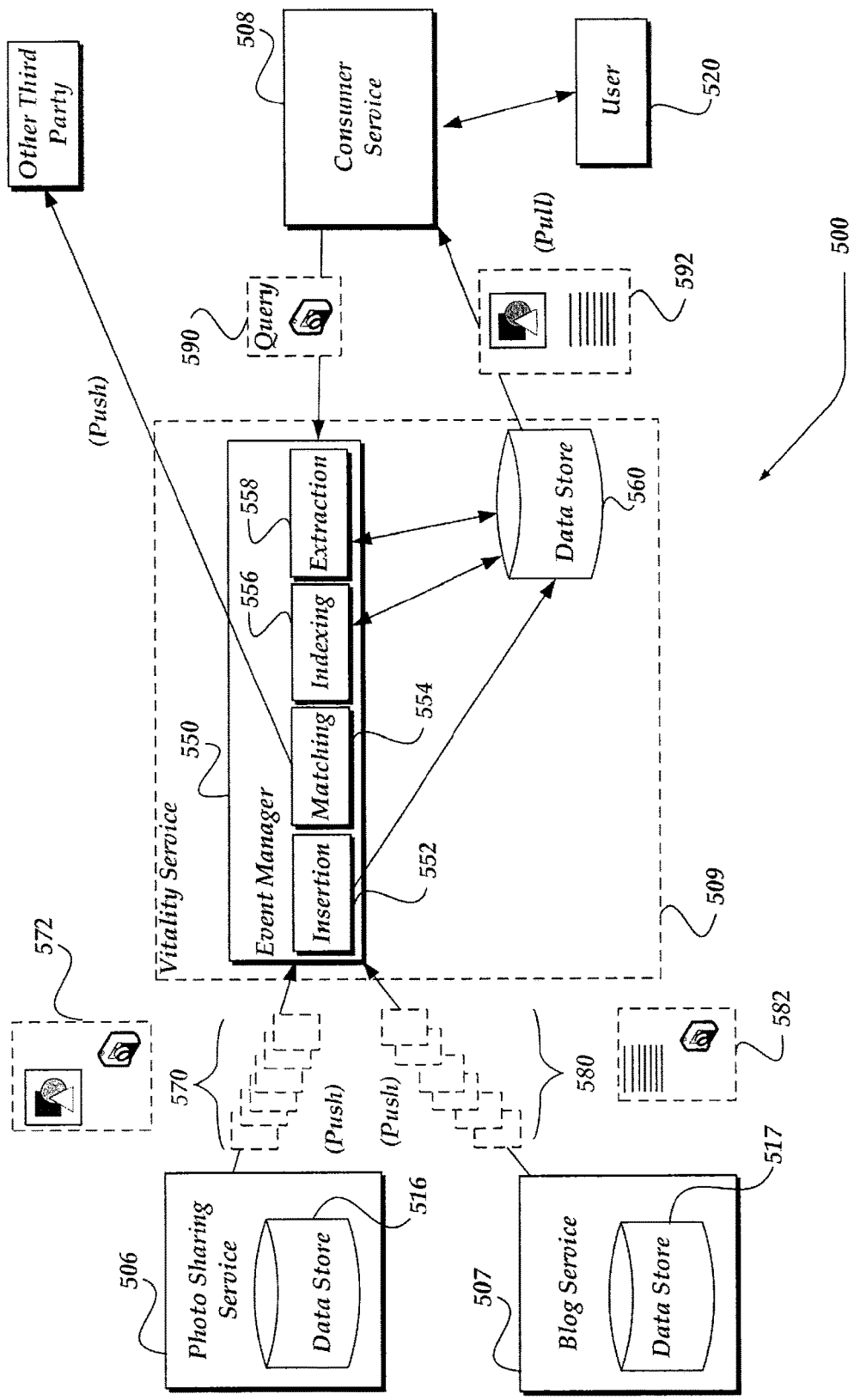
FIG. 5 shows one embodiment of a use case illustrating receiving pushed vitality updates and providing vitality information.

FIG. 5 shows one embodiment of a conceptual block diagram showing a use case of a vitality service, in accordance with the present invention. As such, use case 500 of FIG. 5 may be used to illustrate one non-exhaustive and non-limiting example of using the invention. In other embodiments, more or fewer components than those described may be implemented.

As shown in use case 500, photo sharing service 506 pushes photo summaries 570 to vitality service 509, blog service 507 pushes blog summaries 580 to vitality service 509, and consumer review service 508 extracts vitality information 516 from vitality service 509. In one embodiment, photo sharing service 506, blog service 507, and consumer service 508 represent an embodiment of vitality pushing devices 106-107, and vitality extraction device 108 of FIG. 1, respectively. In one embodiment, vitality service 509 can represent an embodiment of vitality service 109 of FIG. 1 and/or network device 200 of FIG. 2.

In this non-limiting example, vitality service 509 includes data store 560 and vitality manager 550 for managing vitality updates and vitality information at data store 560. In addition, vitality manager 550 includes insertion manager 552, matching manager 554, indexing manager 556, and extraction manager 558, which, in one embodiment may represent an embodiment of insertion manager 252, matching manger 254, indexing manager 256, and extraction manager 258 of FIG. 2, respectively.

As a non-exhaustive, non-limiting example, consider user 520 who is interested in purchasing a digital camera. User 520 may employ consumer service 508 to collect vitality information regarding the digital camera. In one embodiment, user 520 may employ a client device to communicate over a network with consumer service 508. In another embodiment, consumer service 508 may be a client program that resides on the client device of user 520.

In any event, consumer service 508 sends a query request 590 to vitality service 509. In one embodiment, query request 590 includes search criterion associated with the digital camera of interest. For example, user 520 may provide a manufacturer and model number of the digital camera as search criterion in query request 590.

In response to query request 590, vitality manager 550 searches data store 560 and provides vitality information 592. Vitality information 592 includes content from recently pushed vitality updates 572 and 582 that are each related to the digital camera of interest. In other examples, vitality information 592 may include content from other vitality updates, such as ten of the most recent vitality updates related to the digital camera of interest.

Recently pushed vitality update 572 refers to UGC in the form of a photo uploaded to photo sharing service 506 and stored at data store 516. In this non-limiting example, recently pushed vitality update 572 may include a thumbnail and a resource identifier of the user-uploaded photo. Recently pushed vitality update 572 can also include metadata that has been entered by the user that uploaded the photo and/or extracted from the photo by the photo sharing service 506. Such metadata can match the search criteria of query request 590. For example, vitality manager 550 can index recently pushed vitality update 572 according to manufacturer and/or model number of the digital camera of interest.

Recently pushed vitality update 582 includes a content summary that refers to a blog entry provided by a user of blog service 507 and stored at data store 517. In this example, recently pushed vitality update 582 includes an excerpt of text from the user-provided blog entry and a resource identifier referring to the blog entry. The blog entry, for example, may describe a user's experience with the particular camera of interest. The content summary, on the other hand, may include an excerpt of text that refers to the manufacturer and/or model number of the digital camera of interest. In one embodiment, vitality service 509 may also index recently pushed vitality update 582 according to manufacturer and/or model number of the digital camera of interest.

Thus, vitality information 592 provided to user 520 allows user 520 to view a thumbnail of a photo taken by the digital camera and an excerpt from a blog summary discussing the camera. The vitality information 192 also includes resource identifiers that allow user 520 to access a full photo at data store 516 of photo service 506 and to access a complete blog entry at data store 517 of blog service 507.

Embodiments of vitality information provided by vitality service 509 will change over time as more recent vitality updates are pushed to vitality service 509. For example, if user 520 initiates a query request at a later time, the most recent vitality information may refer to different and more recent vitality updates, such as a vitality update that refers to an entirely different photo provided by a different photo sharing service. Accordingly, recent vitality update 572 may no longer be recent, and as such, may be purged from data store 560 or may be sorted out of future search results provided by vitality manager 550. Further, vitality manager 556 can provide other actions, such as pushing vitality information regarding the digital camera of interest to another network device based on matching criteria detected by matching manager 554.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A system of a vitality service, comprising:
a data store for storing program code and a plurality of pushed vitality updates,
   each vitality update comprises a plurality of metadata created in response to a user initiating production of user-generated content (UGC) that includes a combination of content provided by the user and data related to a user's activity pertaining to the provided content,
   each pushed vitality update includes a resource identifier and other types of vitality information referring to the UGC residing on one or more network devices that pushed the corresponding vitality update,
   each stored vitality update is modified to include a timestamp and a geographic location, and
   the other types of vitality information comprising a content summary of the UGC, an identifier unique to an author of the UGC, an identifier that specifies a source of the UGC, an identifier unique to the source of the UGC for disambiguating distinct UGC elements from the user and the source, an identifier describing a type of the UGC, and indexing information for sorting the vitality update, the indexing information comprising one or more tags; and
a processing unit that is operable to execute program code to perform actions, including:
employing an index of each vitality update, the index being based on the indexing information and a recency, the recency being based on a time and date at which each vitality update is pushed, and the index being employed to determine which updates of the vitality updates are of interest based on a keyword matching at least part of the indexing information, the keyword being received from a third party service that is a service separate from the vitality service,
   the index is arranged independent of the user that provided the UGC, and
   at least one vitality update is purged from the data store based at least in part on the recency;
pushing information regarding each determined vitality update of interest to the third party service; and
enabling a vitality manager to perform actions, including:
   receiving a query request;
   searching the data store to identify one or more pushed vitality updates based at least in part on a subject of the query request; and
   providing recent vitality information from a portion of the identified vitality updates that includes one or more resource identifiers and one or more other types of vitality information that are useable to access UGC associated with the recent vitality information for display at another network device.

2. The system of claim 1, wherein the vitality manager is configured to perform actions further including: sorting the results of the search based on time stamp information to identify the recent vitality information.

3. The system of claim 1, wherein the vitality manager is configured to perform actions further including:
   receiving a pushed vitality update from one or more network devices;
   identifying another vitality update in the data store that is similar to the received pushed vitality update based on a content summary; and
   replacing the identified vitality update from the data store with the received vitality update.

4. The system of claim 1, wherein the vitality manager is configured to perform actions further including:

receiving a pushed vitality update from one or more network devices;

providing the received vitality update to the data store; and purging another vitality update from the data store based at least in part on time stamp information of the other vitality update.

5. The system of claim 1, wherein searching the data store to identify the one or more pushed vitality updates includes searching the data store independent of author or creator of the one or more pushed vitality updates.

6. The system of claim 1, wherein the vitality manager is configured to perform actions further including: receiving at least a portion of the plurality of pushed vitality updates in response to one or more client devices providing the UGC to the one or more network devices.

7. The system of claim 1, wherein the vitality manager is configured to perform actions further including: sending a response to at least one of the one or more network devices confirming that a pushed vitality update has been received by the vitality service and/or that the pushed vitality update can be purged from a memory of the one or more network devices.

8. The system of claim 1, wherein the UGC residing on the one or more network devices includes at least one of a blog entry, a digital photo, or a sound file.

9. The system of claim 8, wherein the other types of vitality information associated with the recent vitality information include at least one of a summary of the blog entry, a thumbnail of the photo, or a sample of the sound file.

10. A non-transitory computer-readable storage medium tangibly encoded with computer-executable instructions, that when executed by a computing device, performs a method comprising:

managing, by the computing device of a vitality service, a plurality of pushed vitality updates at a data store, each vitality update comprises a plurality of metadata created in response to a user initiating the production of user-generated content (UGC) that includes a combination of content provided by the user and data related to the user's activity pertaining to the provided content, each pushed vitality update is pushed from a network device to the data store and includes a resource identifier and other types of vitality information referring to the UGC residing at the network device, each stored vitality update is modified to include a timestamp and a geographic location, and the other types of vitality information comprising a content summary of the UGC, an identifier unique to an author of the UGC, an identifier that specifies a source of the UGC, an identifier unique to the source of the UGC that is used to disambiguate distinct UGC elements from the user and the source, and an identifier describing a type of the UGC;

employing, by the computing device, an index of each vitality update, the index being based on recency, the recency being based on a time and date at which each vitality update is pushed, and the index being employed to determine which updates of the vitality updates are of interest based on a keyword matching at least part of the indexing information, the keyword being received from a third party service that is a service separate from the vitality service, the index is arranged independent of the user that provided UGC, and at least one vitality update is purged from the data store based at least in part on the recency;

pushing, by the computing device, information regarding each determined vitality update of interest to the third party service;

receiving, by the computing device, a query request;

searching, by the computing device, the data store to provide search results that identify one or more pushed vitality updates matching a subject of the query request; and providing, by the computing device, at least a portion of the search results such that UGC associated with one or more resource identifiers and one or more other types of vitality information of the search results is accessible for display at another network device.

11. The non-transitory computer-readable storage medium of claim 10, wherein providing the search results further includes providing the search results based at least in part on at least one of when the corresponding UGC of the one or more pushed vitality updates was created, when the one or more pushed vitality updates were pushed to the data store, or when the one or more pushed vitality updates were stored at the data store.

12. The non-transitory computer-readable storage medium of claim 10, wherein the managing data actions further include:

determining if at least one of the plurality of pushed vitality updates includes vitality information that matches at least one matching criterion; and if the vitality information matches the at least one matching criterion, pushing content of the at least one of the plurality of pushed vitality update to a third party network device.

13. The non-transitory computer-readable storage medium of claim 10, wherein the managing data actions further includes at least one of indexing and/or sorting at least a portion of the plurality of pushed vitality updates based on corresponding vitality information of the portion of pushed vitality updates.

14. A first network device of a vitality service, comprising:

a data store that is configured to receive a plurality of vitality updates, each vitality update comprises a plurality of metadata created in response to a user initiating the production of user-generated content (UGC) that includes a combination of content provided by the user and data related to the user's activity pertaining to the provided content, each vitality update pushed from a second network device, each pushed vitality includes a link to the user-generated content (UGC) residing on the second network device and other types of vitality information associated with the UGC provided by the second network device, each stored vitality update is modified to include a timestamp and a geographic location, and the other types of vitality information comprising a content summary of the UGC, an identifier unique to an author of the UGC, an identifier that specifies a source of the UGC, an identifier unique to the source of the UGC for disambiguating distinct UGC elements from the user and the source, an identifier describing a type of the UGC, and indexing information for sorting the vitality update, the indexing information comprising one or more tags; and a processor that is configured to perform actions; including:
employing an index of each vitality update, the index being based on the indexing information and a recency, the recency being based on a time and date at which each vitality update is pushed, and the index being employed to determine which updates of the vitality updates are of interest based on a keyword matching at least part of the indexing information, the keyword being received from a third party service that is a service separate from the vitality service,
wherein the index is arranged independent of the user that provided UGC, and
the at least one vitality update is purged from the data store based at least in part on the recency;
pushing information regarding each determined vitality update of interest to the third party service;
receiving a query request;
searching the data store for at least one vitality update based on the query request;
sorting results of the search based on the recency to provide recent vitality information; and
providing in response to the query request one or more resource identifiers and one or more types of vitality information of the recent vitality information such that at least a portion of the UGC is accessible for display on a third network device.

15. The first network device of claim 14, wherein the processor actions further include indexing the plurality of pushed vitality updates in the data store such that searching the data store is independent of author or creator of the UGC.

16. The first network device of claim 14, wherein the processor actions further include purging one or more vitality updates from the data store based on time stamp information associated with the one or more vitality updates.

17. A method for providing data over a network, comprising:
maintaining, by a processor of a vitality service, a data store of a plurality of pushed content summaries and associated links,
the content summaries and associated links are created in response to a user initiating production of user-generated content (UGC) that includes a combination of content provided by the user and data related to the user's activity pertaining to the provided content,
each pushed content summary and associated link refers to UGC residing on a remote network device,
each stored content summaries and associated links is a vitality update and is modified to include a timestamp and a geographic location, and
each stored content summaries comprises a content summary of the UGC, an identifier unique to an author of the UGC, an identifier that specifies a source of the UGC, an identifier unique to the source of the UGC for disambiguating distinct UGC elements from the user and the source, an identifier describing a type of the UGC, and indexing information for sorting the vitality update, the indexing information comprising one or more tags;
receiving, by the processor, another content summary and another link from another network device that pushes the other content summary and the other link to the data store;
employing, by the processor, an index of each vitality update, the index being based on the indexing information and a recency, the recency being based on a time and date at which each vitality update is pushed, and the index being employed to determine which updates of the vitality updates are of interest based on a keyword matching at least part of the indexing information, the keyword being received from a third party service that is a service separate from the vitality service,
the index is arranged independent of the user that provided the UGC, and
at least one vitality update is purged from the data store based at least in part on the recency;
pushing, by the processor, information regarding each determined vitality update of interest to the third party service;
receiving, by the processor, a query request initiated by a requesting network device;
searching, by the processor, the data store for a content summary and an associated link based on a subject of the query request; and
providing, by the processor, the content summary and the link in response to the query request such that at least a portion of the UGC corresponding to the link is accessible for display at the requesting network device.

18. The method of claim 17, wherein maintaining the data store includes replacing, in the data store, one of the plurality of content summaries and a corresponding link with the other content summary and the other link.

19. The method of claim 17, wherein maintaining the data store includes indexing and/or sorting content summaries and corresponding links residing in the data store based at least in part on time stamp information of the content summaries and the corresponding links residing in the data store.

20. The method of claim 17, wherein maintaining the data store includes indexing and/or sorting content summaries and corresponding links residing in the data store based at least in part on a subject of the query request.

* * * * *